(12) United States Patent
Xia

(10) Patent No.: US 11,082,751 B2
(45) Date of Patent: *Aug. 3, 2021

(54) NETWORK OUTAGE CONTINUED PLAYING METHOD OF ON-DEMAND VIDEO, AND IPTV PLAYING DEVICE

(71) Applicant: AMLOGIC (SHANGHAI) CO., LTD., Shanghai (CN)

(72) Inventor: Yinli Xia, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 136 days.

This patent is subject to a terminal disclaimer.

(21) Appl. No.: 16/707,100

(22) Filed: Dec. 9, 2019

(65) Prior Publication Data

US 2020/0186890 A1 Jun. 11, 2020

(30) Foreign Application Priority Data

Dec. 7, 2018 (CN) .......................... 201811496773.8

(51) Int. Cl.
| | |
|---|---|
| H04N 21/647 | (2011.01) |
| H04L 29/06 | (2006.01) |
| H04N 21/442 | (2011.01) |
| H04N 21/6437 | (2011.01) |
| H04W 4/02 | (2018.01) |

(Continued)

(52) U.S. Cl.
CPC ....... *H04N 21/6473* (2013.01); *H04L 65/607* (2013.01); *H04L 65/608* (2013.01); *H04N 21/44227* (2013.01); *H04N 21/6437* (2013.01); *H04N 21/2187* (2013.01); *H04N 21/6118* (2013.01); *H04W 4/02* (2013.01)

(58) Field of Classification Search
CPC ......... H04N 21/6473; H04N 21/44227; H04N 21/6437; H04N 21/6118; H04N 21/2187; H04L 65/607; H04L 65/608; H04W 4/02
See application file for complete search history.

(56) References Cited

U.S. PATENT DOCUMENTS

| | | | | |
|---|---|---|---|---|
| 9,877,073 | B2* | 1/2018 | Gaur | H04N 21/6118 |
| 9,942,579 | B2* | 4/2018 | Lin | H04N 21/2187 |
| 2014/0066042 | A1* | 3/2014 | Hilton | H04W 4/02 |
| | | | | 455/418 |

FOREIGN PATENT DOCUMENTS

| | | |
|---|---|---|
| CN | 101401427 A | 4/2009 |
| CN | 102724566 A | 10/2012 |

* cited by examiner

*Primary Examiner* — Vinncelas Louis
(74) *Attorney, Agent, or Firm* — Harness, Dickey & Pierce, P.L.C.

(57) ABSTRACT

The invention provides a network outage continued playing method of an on-demand video, and an IPTV playing device, wherein the method comprises: connecting a network to acquire a data stream of the video; playing, by a player, the data stream, and obtaining a start playing time of the video; in the case of network outage, obtaining the playing time length of playing the video; when network is connected again, obtaining a time point according to the start playing time and the playing time length; searching for, by the player, according to the time point, and starting to continue to play the video at the display time label of the key frame. The present invention has the beneficial effects of directly performing the breakpoint continued playing of the on-demand video from the network outage time point when the network is connected again.

16 Claims, 6 Drawing Sheets

(51) Int. Cl.
*H04N 21/2187* (2011.01)
*H04N 21/61* (2011.01)

Step S1, connecting a network to acquire a data stream of the video;

Step S2, processing the data stream to obtain a start playing time of the video;

Step S3, in the case of network outage, obtaining the playing time length of playing the video in the player;

Step S4, when network is connected again, obtaining a time point of playing interruption of the video according to the start playing time and the playing time length;

Step S5, the player returns to the time point, and continue to play the video from the time point.

FIG. 1

NETWORK OUTAGE CONTINUED PLAYING METHOD OF ON-DEMAND VIDEO, AND IPTV PLAYING DEVICE

CROSS-REFERENCE TO RELATED APPLICATIONS

The present application claims priority to and the benefit of Chinese Patent Application No. CN 201811496773.8 filed on Dec. 7, 2018, the entire content of which is incorporated herein by reference.

FIELD

The invention relates to the field of communication technologies, and more particularly, to a network outage continued playing method of an on-demand video and an IPTV playing device.

BACKGROUND

IPTV (Internet Protocol Television) is a brand-new technology that incorporating internet technology, multimedia technology, and communication technology, etc., aiming to deliver various interactive services (for example, digital TVs) to family members via a broadband network. With the development of internet technology, an increasing number of people pay more attention to live web-cast, which in turn brings people to focus more on time shifting. People are allowed to watch live TV programs, major events and news by using network signals, offering people more choices over the contents they desire to watch. When a user plays an on-demand video by using an IPTV box, the video may be caused to stop due to the instability of internet. In this case, it is expected that the video may resume playing from a point in the video at which the video is paused after the network is connected again. However, it should be understood that an optimum solution dedicated to this issue is unavailable in the market due to the fact that there are too many resources in the internet.

SUMMARY

Given that the foregoing problems exist in the prior art, the present invention provides a network outage continued playing method of an-demand video from a time point of playing interruption of the video after the network is connected again, and an IPTV playing device.

The detailed technical solution is as follows:

a network outage continued playing method of an on-demand video, wherein a player is provided for playing the on-demand video, wherein the method comprises the steps of:

Step S1, connecting a network to acquire a data stream of the video and establishing a list;

wherein, a relationship between frames and playing times is established in the list;

Step S2, playing, by the player, the data stream, and obtaining a start playing time of the video when the data stream is initialized;

Step S3, in the case of network outage, obtaining the playing time length of playing the video in the player;

Step S4, when network is connected again, obtaining a time point of playing interruption of the video according to the start playing time point and the playing time length; and Step S5, searching for, by the player, a display time label of a corresponding key frame from the list according to the time point, and starting to continue to play the video at the display time label of the key frame.

Preferably, in the above-mentioned method, wherein Step S1 comprises: obtaining the data stream of the video via Real-Time Transport Control Protocol (RTCP).

Preferably, in the above-mentioned method, wherein Step S1 comprises: obtaining the list via RTCP; and/or the relationship between the frames and the playing times comprises: a relationship between a frame number of each frame and the playing times, and a relationship between the display time label of each key frame and the playing times.

Preferably, in the above-mentioned method, wherein Step S2 comprises: when the data stream is initialized, obtaining the start playing time of the video by decoding the data stream.

Preferably, in the above-mentioned method, wherein

Step S2 further comprises: obtaining the start playing time of the video via RTCP in the player when decoding the data stream; and/or the player is a ctcplayer.

Preferably, in the above-mentioned method, wherein in Step S3, the player detects network connection status in real time;

when the player detects the network outage, recording the playing time length of the video in the player.

Preferably, in the above-mentioned method, wherein in Step S4, the player detects the network connection status in real time;

when the player detects that the network is connected again, splicing the start playing time and the playing time length, to obtain the time point.

Preferably, in the above-mentioned method, wherein Step S5 further comprises: the player, according to the time point, searches for a display time label of a corresponding key frame based on the time which the player plays and retrieves the display time label, and starting to continue to play the video at the display time label of the key frame.

An IPTV playing device for playing an on-demand video is provided, comprising: a display, a processor, an internal memory, an external memory, and a communicator, the processor being connected to the display, the internal memory, the external memory, and the communicator, respectively, and further comprising: an operating system, wherein the processor is configured to run the operating system, the operating system runs a playing application, and the playing application comprises:

a list establishing module for obtaining a data stream of the video after the video is connected to the network through the communicator, and establishing a list according to the data stream;

wherein, a relationship between frames and playing time is established in the list;

a start playing time acquisition module, connected to the list establishing module, configured to acquire the data stream played by the IPTV playing device, and configured to acquire the start playing time of the video when the data stream is initialized;

a playing time length acquisition module, connected to the start playing time acquisition module, configured to acquire a playing time length of the video in the IPTV playing device when the network is disconnected through the communicator;

an interruption time point acquisition module, connected to the start playing time acquisition module and the playing time length acquisition module, respectively, and configured to acquire a time point of playing interruption of the video according to the start playing time and the playing time length when the communicator is connected to the network again; and a display time label acquisition module, connected to the list establishing module and the interruption time point acquisition module, respectively, and configured to search for a display time label of a corresponding key frame from the list according to the time point, and to start to continue to play the video at the display time label of the key frame.

Preferably, in the IPTV playing device, wherein the list establishing module comprises a data stream acquisition unit for acquiring the data stream of the video via Real-Time Transport Control Protocol (RTCP).

Preferably, in the IPTV playing device, wherein the list establishing module comprises a list acquisition unit for acquiring the list via RTCP;

wherein, the relationship between the frames and the playing time comprises: a relationship between a frame number of each frame and the playing time, and a relationship between the display time label of each key frame and the playing time.

Preferably, in the IPTV playing device, wherein the start playing time acquisition module comprises:

a decoding unit for acquiring the start playing time of the video by decoding the data stream when the data stream is initialized.

Preferably, in the IPTV playing device, wherein the decoding unit comprises:

a decoding component, applied to a decoding operation, and configured to acquire the start playing time of the video via RTCP.

Preferably, in the IPTV playing device, wherein the playing time length acquisition module comprises:

a first network detection unit for detecting connection status between the communicator and the network;

a playing time length recording unit, connected to the first network detection unit, and configured to record the playing time length of the video in the IPTV playing device when the first network detection unit detects that the communicator is disconnected from the network.

Preferably, in the IPTV playing device, wherein the interruption time point acquisition module comprises:

a second network detection unit for detecting connection status between the communicator and the network;

an interruption time point computing unit, connected to the second network detection unit, and configured to splice the start playing time and the playing time length to obtain the time point when the second network detection unit detects that the communicator is connected to the network again.

Preferably, in the IPTV playing device, wherein the display time label acquisition module comprises:

a search unit for searching for a display time label of the key frame based on the time which the IPTV playing device plays and retrieves the display time label, according to the time point; and a playing unit, connected to the search unit, and configured to start to continue to play the video at the display time label of the key frame.

Preferably, in the IPTV playing device, wherein the operating system is an Android operating system.

The present invention has the beneficial effects of: by obtaining the start playing time and the playing time length of the video and directly performing the breakpoint continued playing of the on-demand video from the network outage time point when the network is connected again.

BRIEF DESCRIPTION OF THE DRAWINGS

The accompanying drawings, together with the specification, illustrate exemplary embodiments of the present disclosure, and, together with the description, serve to explain the principles of the present invention.

FIG. 1 is a flowchart for an embodiment of a network outage continued playing method of an on-demand video according to the present invention;

DETAILED DESCRIPTION

Figure 2:
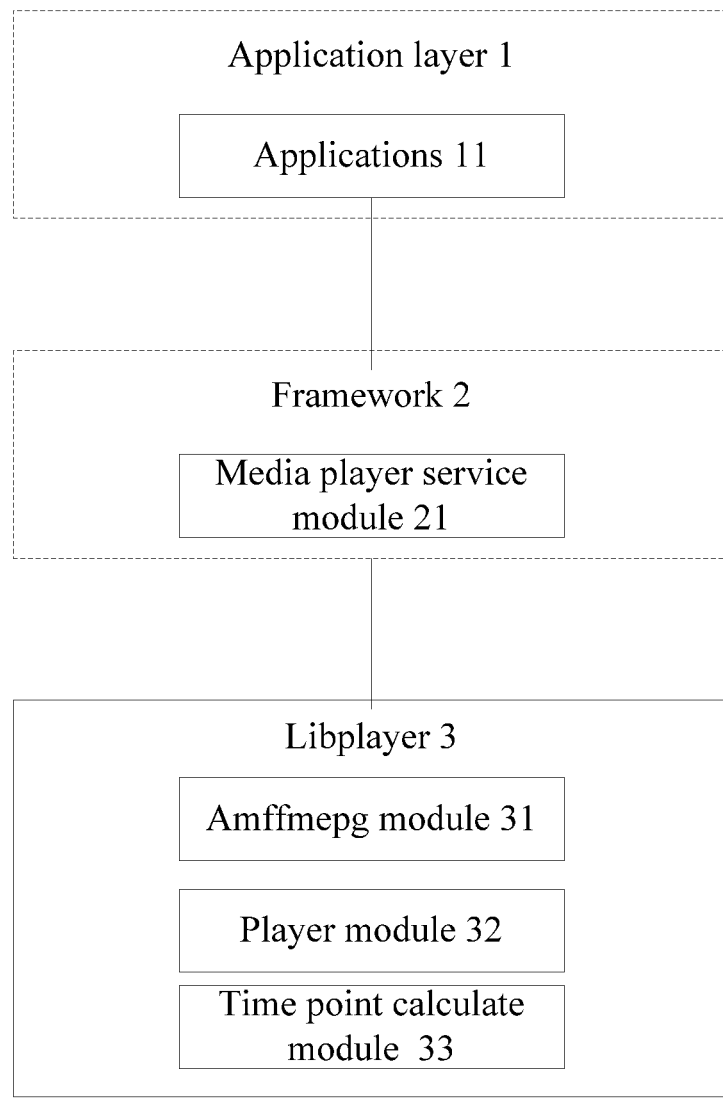
FIG. 2 is a schematic diagram showing a structure of an operating system of an IPTV playing device according to an embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, certain exemplary embodiments according to the present disclosure will be described with reference to the accompanying drawings.

The invention comprises a network outage continued playing method of an on-demand video, wherein a player is provided for playing the on-demand video, as shown in FIG. 1, the method comprises the steps of:

Step S1, connecting a network to acquire a data stream of the video, and establishing a list;

wherein, a relationship between frames and playing times is established in the list;

Step S2, playing, by the player, the data stream, and obtaining a start playing time of the video when the data stream is initialized;

Step S3, in the case of network outage, obtaining the playing time length of playing the video in the player;

Step S4, when network is connected again, obtaining a time point of playing interruption of the video according to the start playing time and the playing length; and Step S5, searching for, by the player, a display time label of a corresponding key frame from the list according to the time point, and starting to continue to play the video at the display time label of the key frame.

Furthermore, as a preferred embodiment, the player plays the on-demand video by using the above-mentioned network outage continued playing method; when the player starts to play the on-demand video, that is, when connecting to the network, the player obtains a start playing time of the video and saves the list comprising a frame number of each frame and a display time label of each key frame in the video. The player detects network connection status in real time during the playing of the on-demand video. When the player detects that the network is connected, the player continue playing the on-demand video. When is the player detects that the network is disconnected, the player obtains the playing time length of playing the video in the player. When the player detects that the network is connected again, the player obtains the time point of playing interruption of the video according to the start playing time and the playing time length, and the player searches for a display time label of a corresponding to the key frame from the list based on the time point, and starts to continue to play the video at display time label of the key frame corresponding to the time point. After the network is connected again, searching for the display time label of the key frame corresponding to the time point in the list based on the time point, such that the playing of on-demand video is continued from the time point after the network is connected again.

Furthermore, as a preferred embodiment, the player plays the on-demand video by using the above-mentioned network outage continued playing method; when the player starts to play the on-demand video, that is, when connecting to the network, the player may activate a ring buffer storage area and buffers the data stream according to a storage capacity of the ring buffer storage area, such that the video may continue playing for a period of time even when the network is disconnected. After the network is restored, the player clears all the data in the ring buffer storage area and closes the ring buffer storage area. Then the player searches for the display time label of the key frame corresponding to the time point in the list based on the time point, such that the playing of on-demand video is continued from the time point when the network is connected again.

Furthermore, in the above-mentioned embodiment, Step S1 comprises obtaining the data stream of the video via Real-Time Transport Control Protocol (RTCP).

Furthermore, in the above-mentioned embodiment, Step S1 comprises obtaining the list via RTCP.

Furthermore, in the above-mentioned embodiment, the relationship between the frames and the playing times comprises: a relationship between a frame number of each frame and the playing times, and a relationship between the display time label of each key frame and the playing times.

Furthermore, in the above-mentioned embodiment, Step S2 comprises: when the data stream is initialized, obtaining the start playing time of the video by decoding the data stream.

Furthermore, in the above-mentioned embodiment, Step S2 further comprises: obtaining the start playing time of the video via RTCP in the player when decoding the data stream, and the start playing time is recorded as t1.

Furthermore, in the above-mentioned embodiment, the player is a ctcplayer.

Furthermore, in the above-mentioned embodiment, in Step S3, the player detects network connection status in real time;

when is the player detects that the network is disconnected, recording the playing time length of the video in the player, and the playing time length is recorded as t2.

Furthermore, in the above-mentioned embodiment, in Step S4, the player detects the network connection status in real time;

when is the player detects that the network is connected again, splicing the start playing time and the playing time length to obtain the time point, and the time point is recorded as t3, that is, t3=t1+t2. Thus, the time point t3 is obtained by splicing the start playing time and the playing time length.

Furthermore, in the above-mentioned embodiment, Step S5 further comprises: the player, according to the time point, searches for a display time label of a corresponding key frame based on the time which the player plays, and starting to continue to play the video at the display time label of the key frame.

The invention further comprises an IPTV playing device for playing an on-demand video, the device comprising:

an operating system, wherein the operating system runs a playing application, wherein the playing application uses the any one of the methods as described above.

Furthermore, in the above-mentioned embodiment, the operating system is an Android operating system.

Furthermore, as a preferred embodiment, as shown in FIG. 2, the Android operating system of the IPTV playing device comprises: application layer 1, a framework 2, and a libplayer 3, wherein the application layer 1 has an Android-Package (APK), and the APK acquires the required video file through shareprefrence (a way of data storing of Android) and saves a list comprising a frame number of each frame and a display time label of each key frame in the video; in the framework 2, a media player service module 21 (mediaplayersevice) parses the video information, and creates a message thread using a notification mechanism, so as to trigger an invoke.

Furthermore, as a preferred embodiment, it should be noted that when a message indicating the network is disconnected is received by the framework 2, the message thread is triggered and the message of network disconnection is sent to the libplayer 3; then the message of network disconnection is received by the libplayer 3, such that the playing time length is obtained.

The notification mechanism acts to save an operation that should be performed into a chain (notification chain) when the event occurs by the function pointer for a person to be notified of the event, and then the notifier sequentially executes the callback of each element in the linked list when the event occurs, and notification is completed. The above message thread is written with a seek function.

A player module 32 in the libplayer 3 is used to play the on-demand video. An Amffmepg module 31 invokes a unit for RTCP in a ffmpeg parsing module of the Amffmepg module 31, to obtain the start playing time; a time point calculate module 33 in the libplayer 3 performs time search operation.

Furthermore, as a preferred embodiment, when the video is initialized, the Amffmepg module 31 invokes the unit for RTCP in a ffmpeg parsing module of the Amffmepg module 31, to obtain the start playing time.

Secondly, the time search operation of the player may be performed by the seek function: setting four types of flags, and choosing a corresponding flag depending on different file types.

The first type of flag: #define AVSEEK_FLAG_BACKWARD 1///< seek backward.

The first type of flag may search for the display time labels of the key frame and return when the seek function is performed. For example, when the seek function searches at a point at 10 s of the playing time, the first type of flag may find the display time labels of the key frame at 9 s of the playing time and return to the display time labels of the key frame at 9 s.

The second type of flag: #define AVSEEK_FLAG_BYTE 2///< seeking based on position in bytes.

The second type of flag can be processed by the seek byte function when the ts file (transport stream) of the video is very standard, thereby improving the processing efficiency.

For example, the data stream at 10 s of the playing time has a size of 10M, and the data stream at 20 s of the playing time has a size of 20 M, such that all display time labels of the key frame are treated in bytes during the operation of the seek function. Therefore, returning a specific position is treated in bytes by the operation of the seek function, that is, returning to a specific byte of ts file.

The third flag bit: #define AVSEEK_FLAG_ANY 4///< seek to any frame, even non-keyframes.

The third flag bit may return to any position of the video's playing time through the seek function, wherein the position may not be the display time label of the key frame.

The fourth flag: #define AVSEEK_FLAG_FRAME 8///< seeking based on frame number.

The fourth type of flag can use the seek function to return a specific position of the time axis according to the display time label of the key frame without considering the effect of the display time label of the key frame.

Figure 3:
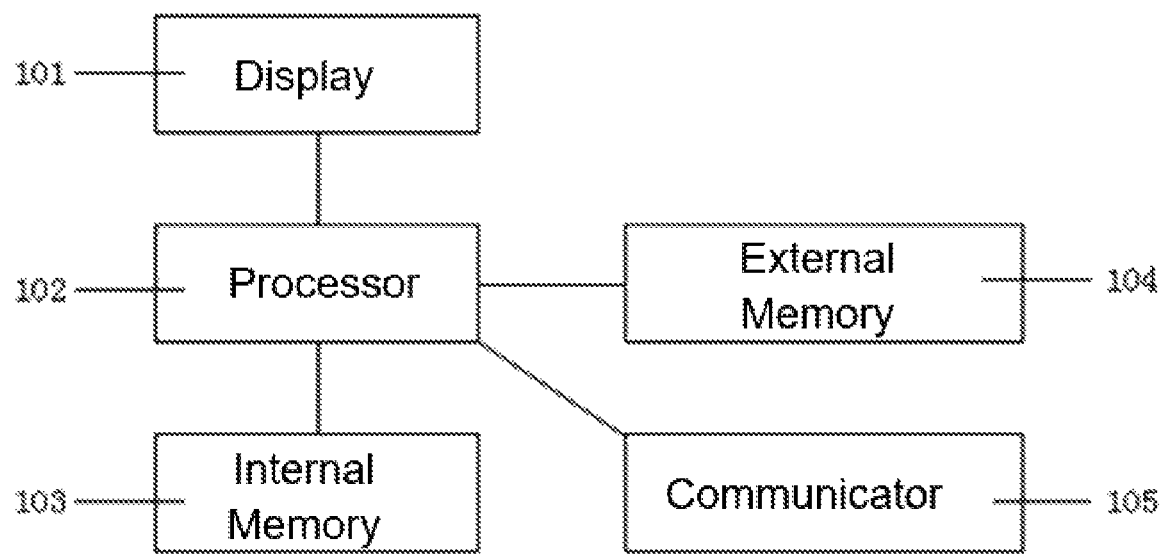
FIG. 3 is a schematic diagram showing a structure of the IPTV playing device according to an embodiment of the present invention.
Figure 4:
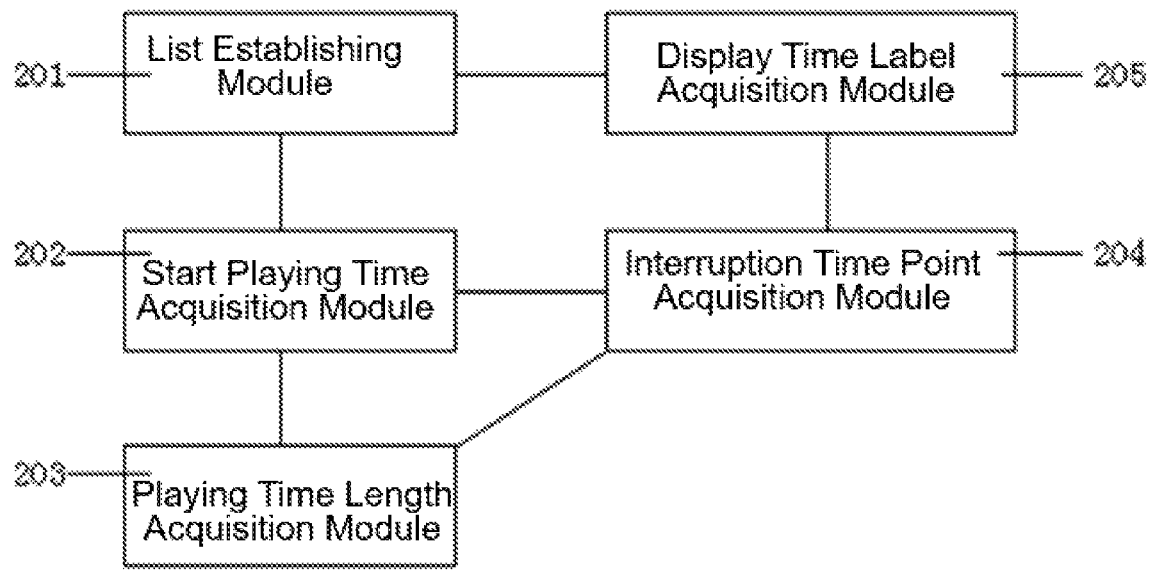
FIG. 4 is a schematic diagram showing a structure of a playing application of the IPTV playing device according to an embodiment of the present invention.

Furthermore, as shown in FIG. 3, an IPTV playing device for playing an on-demand video is provided, comprising: a display 101, a processor 102, an internal memory 103, an external memory 104, and a communicator 105, the processor 102 being connected to the display 101, the internal memory 103, the external memory 104, and the communicator 105, respectively, and further comprising: an operating system, wherein the processor 102 is configured to run the operating system, the operating system runs a playing application, and as shown in FIG. 4, the playing application comprises:

a list establishing module 201 for obtaining a data stream of the video after the video is connected to the network through the communicator 105, and establishing a list according to the data stream;

wherein, a relationship between frames and playing time is established in the list;

a start playing time acquisition module 202, connected to the list establishing module 201, configured to acquire the data stream played by the IPTV playing device, and configured to acquire the start playing time of the video when the data stream is initialized;

a playing time length acquisition module 203, connected to the start playing time acquisition module 202, configured to acquire a playing time length of the video in the IPTV playing device when the network is disconnected through the communicator 105;

an interruption time point acquisition module 204, connected to the start playing time acquisition module 202 and the playing time length acquisition module 203, respectively, and configured to acquire a time point of playing interruption of the video according to the start playing time and the playing time length when the communicator 105 is connected to the network again; and a display time label acquisition module 205, connected to the list establishing module 201 and the interruption time point acquisition module 204, respectively, and configured to search for a display time label of a corresponding key frame from the list according to the time point, and to start to continue to play the video at the display time label of the key frame.

In the above-mentioned embodiment, when the IPTV playing device plays the on-demand video, that is, when the communicator 105 in the IPTV playing device connects to network, the start playing time acquisition module 202 acquires the start playing time of the on-demand video and establishes a list comprising a frame number of each frame, and a display time label of each key frame; the playing application detects the network connection status in real time during the playing of the on-demand video, when network is connected, the playing application continues to play the on-demand video; when the network is disconnected, the start playing time acquisition module 202 acquires a playing time length of the on-demand video; when network is connected again, the interruption time point acquisition module 204 acquires a time point of playing interruption of the video according to the start playing time and the playing time length, the display time label acquisition module 205 searches for a display time label of a corresponding key frame from the list according to the time point, and starts to continue to play the video at the display time label of the key frame corresponding to the time point, and the playing video is displayed in the display 101. Performing the breakpoint continued playing of the on-demand video by searching for a display time label of a corresponding key frame from the list according to the network outage time point, then directly performing the breakpoint continued playing of the on-demand video from the network outage time point when the network is connected again.

Figure 5:
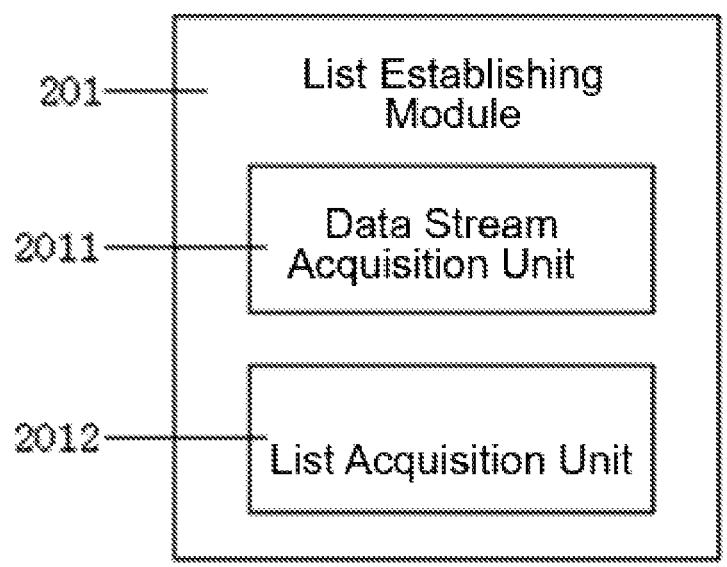
FIG. 5 is a schematic diagram showing a structure of a list establishing module of the IPTV playing device according to an embodiment of the present invention.

Furthermore, in the above-mentioned embodiment, as shown in FIG. 5, the list establishing module 201 comprises a data stream acquisition unit 2011 for acquiring the data stream of the video via Real-Time Transport Control Protocol (RTCP).

Furthermore, in the above-mentioned embodiment, as shown in FIG. 5, the list establishing module 201 comprises a list acquisition unit 2012 for acquiring the list via RTCP;

wherein, the relationship between the frames and the playing time comprises: a relationship between a frame number of each frame and the playing time, and a relationship between the display time label of each key frame and the playing time.

Figure 6:
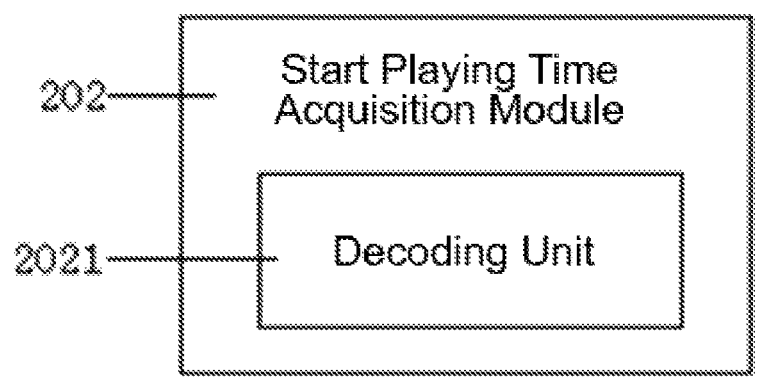
FIG. 6 is a schematic diagram showing a structure of a start playing time acquisition module of the IPTV playing device according to an embodiment of the present invention.

Furthermore, in the above-mentioned embodiment, as shown in FIG. 6, the start playing time acquisition module 202 comprises:

a decoding unit 2021 for acquiring the start playing time of the video by decoding the data stream when the data stream is initialized.

Figure 7:
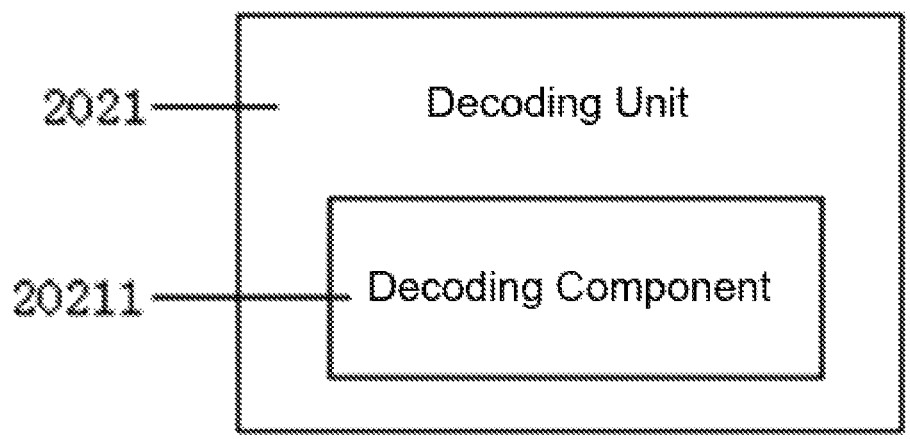
FIG. 7 is a schematic diagram showing a structure of a decoding unit of the IPTV playing device according to an embodiment of the present invention.

Furthermore, in the above-mentioned embodiment, as shown in FIG. 7, the decoding unit 2021 comprises:

a decoding component 20211, applied to a decoding operation, and configured to acquire the start playing time of the video via RTCP.

Figure 8:
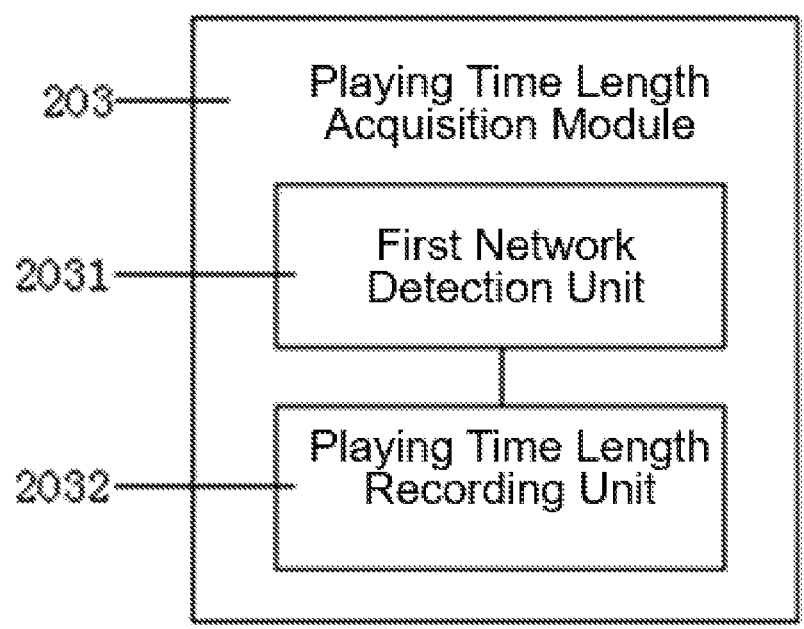
FIG. 8 is a schematic diagram showing a structure of a playing time length acquisition module of the IPTV playing device according to an embodiment of the present invention.

Furthermore, in the above-mentioned embodiment, as shown in FIG. 8, the playing time length acquisition module 203 comprises:

a first network detection unit 2031 for detecting connection status between the communicator 105 and the network;

a playing time length recording unit 2032, connected to the first network detection unit 2031, and configured to record the playing time length of the video in the IPTV playing device when the first network detection unit 2031 detects that the communicator 105 is disconnected from the network.

Figure 9:
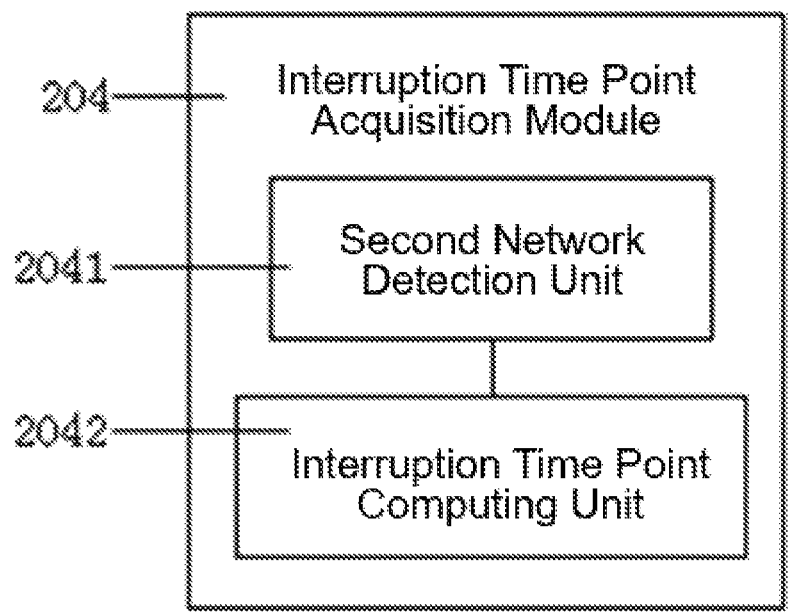
FIG. 9 is a schematic diagram showing a structure of an interruption time point acquisition module of the IPTV playing device according to an embodiment of the present invention.

Furthermore, in the above-mentioned embodiment, as shown in FIG. 9, the interruption time point acquisition module 204 comprises:

a second network detection unit 2041 for detecting connection status between the communicator 105 and the network;

an interruption time point computing unit 2042, connected to the second network detection unit 2041, and configured to splice the start playing time and the playing time length to obtain the time point when the second network detection unit detects that the communicator 105 is connected to the network again.

Figure 10:
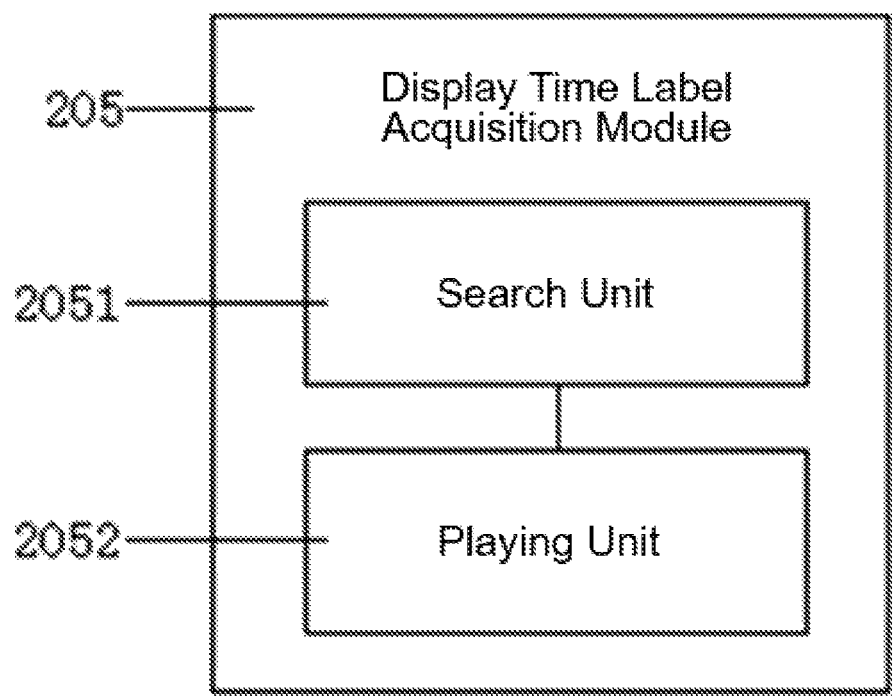
FIG. 10 is a schematic diagram showing a structure of a display time label acquisition module of the IPTV playing device according to an embodiment of the present invention.

Furthermore, in the above-mentioned embodiment, as shown in FIG. 10, the display time label acquisition module 205 comprises:

a search unit 2051 for searching for a display time label of the key frame based on the time which the IPTV playing device plays and retrieves the display time label, according to the time point; and a playing unit 2052, connected to the search unit 2051, and configured to start to continue to play the video at the display time label of the key frame.

Furthermore, in the above-mentioned embodiment, the operating system is an Android operating system.

When the player plays the on-demand video, the libplayer 3 obtains the start playing time, and detects network connection status in real time when the video is playing. When the player detects that the network is connected as expected, continue playing the on-demand video; when the player detects that the network is disconnected, when a message indicating the network is disconnected is received by the framework 2, the message thread is triggered and the message of network disconnection is sent to the libplayer 3; then the message of network disconnection is received by the libplayer 3, such that the playing time length is obtained. When the network is connected again, the libplayer 3 obtains the time point of playing interruption of the video according to the start playing time and the playing time length, and obtains a time point of playing interruption of the video by obtaining the start playing time and the playing time length; and the player searches for a display time label corresponding to the key frame in the list based on the time point, and starts to continue to play the video at the display time label of the key frame corresponding to the time point. After the network is connected again, searching for the display time label of the key frame corresponding to the time point in the list based on the time point, such that the playing of on-demand video is continued from the time point of playing interruption of the video when network is connected again.

Furthermore, as a preferred embodiment, when the player plays the on-demand video, that is when the player is connected to the network, the player may activate a ring buffer storage area and buffers the data stream according to a storage capacity of the ring buffer storage area, such that the video may continue playing for a period of time even when the network is disconnected. After the network is restored, the player clears all the data in the ring buffer storage area and closes the ring buffer storage area, such that the implemention of the seek function in the ring buffer storage area may be avoided. Temporal parsing is done by a unit for RTCP in a ffmpeg parsing module, and the operation information of the seek function is sent to the framework 2 by using the notification mechanism. A time point calculate module 33 in the libplayer 3 performs time search, and returns to the display time label of the key frame corresponding to the time point in the list for network outage continued playing of the on-demand video.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A network outage continued playing method of an on-demand video, wherein a player is provided for playing the on-demand video, wherein the method comprises the steps of:

Step S1, connecting a network to acquire a data stream of the video, and establishing a list;

wherein, a relationship between frames and playing times is established in the list;

Step S2, playing, by the player, the data stream, and obtaining a start playing time of the video when the data stream is initialized;

Step S3, in the case of network outage, obtaining the playing time length of playing the video in the player;

Step S4, when the network is connected again, obtaining a time point of playing interruption of the video according to the start playing time and the playing time length; and Step S5, searching for, by the player, a display time label of a corresponding key frame from the list according to the time point, and starting to continue to play the video at the display time label of the key frame.

2. The network outage continued playing method of the on-demand video of claim 1, wherein Step S1 comprises: obtaining the data stream of the video via Real-Time Transport Control Protocol (RTCP).

3. The network outage continued playing method of the on-demand video of claim 1, wherein Step S1 comprises: obtaining the list via RTCP; and/or the relationship between the frames and the playing time comprises: a relationship between a frame number of each frame and the playing time, and a relationship between the display time label of each key frame and the playing times.

4. The network outage continued playing method of the on-demand video of claim 1, wherein Step S2 comprises: when the data stream is initialized, obtaining the start playing time of the video by decoding the data stream.

5. The network outage continued playing method of the on-demand video of claim 1, wherein in Step S3, the player detects network connection status in real time; when the player detects the network outage, recording the playing time length of the video in the player.

6. The network outage continued playing method of the on-demand video of claim 1, wherein in Step S4, the player detects the network connection status in real time; when the player detects that the network is connected again, splicing the start playing time and the playing time length, to obtain the time point.

7. The network outage continued playing method of the on-demand video of claim 1, wherein Step S5 further comprises: the player, according to the time point, searches a display time label of a corresponding key frame based on the time which the player plays and retrieves the display time label, and starting to continue to play the video at the display time label of the key frame.

8. An IPTV playing device for playing an on-demand video, comprising: a display, a processor, an internal memory, an external memory, and a communicator, the processor being connected to the display, the internal memory, the external memory, and the communicator, respectively, and further comprising: an operating system, wherein the processor is configured to run the operating system, the operating system runs a playing application, and the playing application comprises:
 a list establishing module for obtaining a data stream of the video after the video is connected to the network through the communicator, and establishing a list according to the data stream;
 wherein, a relationship between frames and playing times is established in the list;
 a start playing time acquisition module, connected to the list establishing module, configured to acquire the data stream played by the IPTV playing device, and configured to acquire the start playing time of the video when the data stream is initialized;
 a playing time length acquisition module, connected to the start playing time acquisition module, configured to acquire a playing time length of the video in the IPTV playing device when the network is disconnected through the communicator;
 an interruption time point acquisition module, connected to the start playing time acquisition module and the playing time length acquisition module, respectively, and configured to acquire a time point of playing interruption of the video according to the start playing time and the playing time length when the communicator is connected to the network again; and
 a display time label acquisition module, connected to the list establishing module and the interruption time point acquisition module, respectively, and configured to search for a display time label of a corresponding key frame from the list according to the time point, and to start to continue to play the video at the display time label of the key frame.

9. The IPTV playing device of claim 8, wherein the list establishing module comprises a data stream acquisition unit for acquiring the data stream of the video via Real-Time Transport Control Protocol (RTCP).

10. The IPTV playing device of claim 8, wherein the list establishing module comprises a list acquisition unit for acquiring the list via RTCP;
 wherein, the relationship between the frames and the playing time comprises: a relationship between a frame number of each frame and the playing time, and a relationship between the display time label of each key frame and the playing time.

11. The IPTV playing device of claim 10, wherein the start playing time acquisition module comprises:
 a decoding unit for acquiring the start playing time of the video by decoding the data stream when the data stream is initialized.

12. The IPTV playing device of claim 11, wherein the decoding unit comprises:
 a decoding component, applied to a decoding operation, and configured to acquire the start playing time of the video via RTCP.

13. The IPTV playing device of claim 8, wherein the playing time length acquisition module comprises:
 a first network detection unit for detecting connection status between the communicator and the network;
 a playing time length recording unit, connected to the first network detection unit, and configured to record the playing time length of the video in the IPTV playing device when the first network detection unit detects that the communicator is disconnected from the network.

14. The IPTV playing device of claim 8, wherein the interruption time point acquisition module comprises:
 a second network detection unit for detecting connection status between the communicator and the network;
 an interruption time point computing unit, connected to the second network detection unit, and configured to splice the start playing time and the playing time length to obtain the time point when the second network detection unit detects that the communicator is connected to the network again.

15. The IPTV playing device of claim 8, wherein the display time label acquisition module comprises:
 a search unit for searching for a display time label of the key frame based on the time which the IPTV playing device plays and retrieves the display time label, according to the time point; and
 a playing unit, connected to the search unit, and configured to start to continue to play the video at the display time label of the key frame.

16. The IPTV playing device of claim 8, wherein the operating system is an Android™ operating system.

* * * * *